J. M. FORSYTH.
SAFETY KNIFE GUARD.
APPLICATION FILED APR. 26, 1918.
1,292,292.
Patented Jan. 21, 1919.
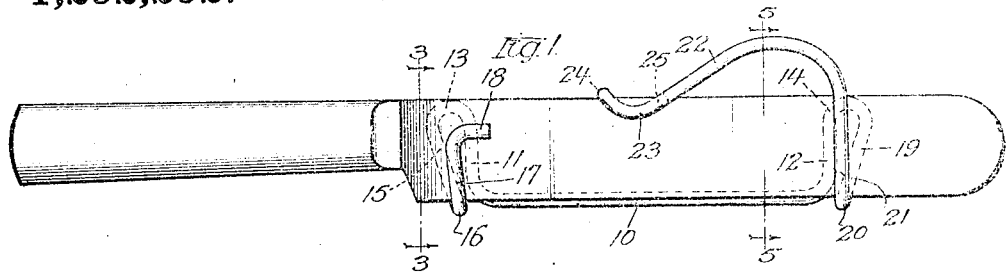
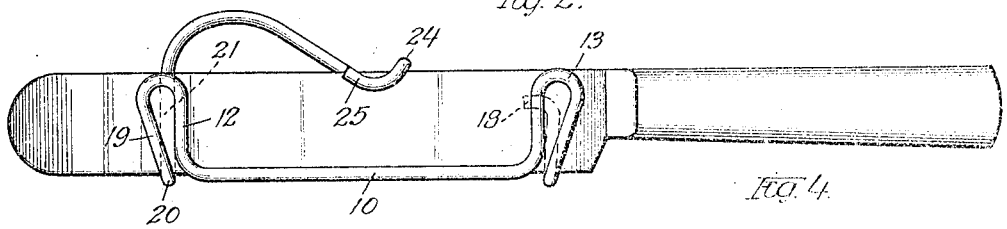
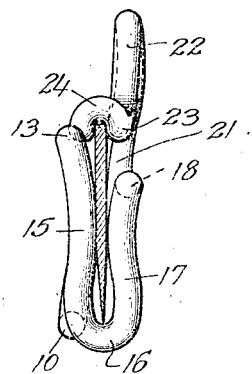
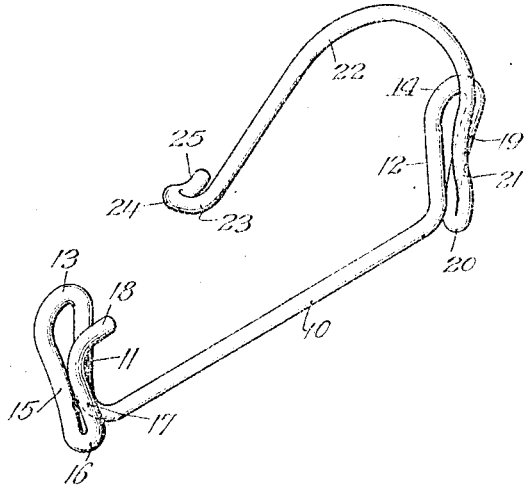
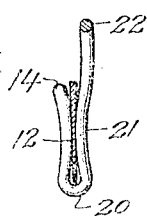
Witnesses:
Robert H. Weir
Inventor
J. M. Forsyth
Benjamin, Rooshauer & Lundy
Attys.

UNITED STATES PATENT OFFICE.

JOHN M. FORSYTH, OF LOS ANGELES, CALIFORNIA.

SAFETY KNIFE-GUARD.

1,292,292.

Specification of Letters Patent.

Patented Jan. 21, 1919.

Application filed April 26, 1918. Serial No. 230,935.

*To all whom it may concern:*

Be it known that I, JOHN M. FORSYTH, a citizen of the United States, and a resident of the city of Los Angeles, in the county of Los Angeles and State of California, have invented certain new and useful Improvements in Safety Knife-Guards, of which the following is a specification.

My invention relates to improvements in guards for the cutting edge of knives and similar articles, and more particularly to paring or slicing knives. One of the objects of my invention is the provision of a suitable guard that has a protecting edge adapted to extend below the cutting edge of the knife blade and to be spaced a slight distance from the adjacent surface of the blade so that thin slices or wafers may be made when cutting vegetables, fruit and the like. Another object of my invention is the provision of a guard that is adapted to be readily attached to or detached from the blade of a knife, without the necessity of altering the structure of the blade or the use of special tools. A further object of my invention is the provision in a knife guard of means whereby the same is adapted to be readily retained in position, and means are also provided to prevent accidental removal or slippage of the guarding strip with relation to the blade to which it is attached.

Further objects will be obvious after an understanding of my invention is had, among which is the provision of a guard for knife blades that is easy to install, dependable in operation and very economical to manufacture.

I prefer to accomplish the divers objects by the means and substantially in the manner hereinafter fully described, reference being had to the accompanying drawings forming a part of this specification, in which,—

Figure 1 is a longitudinal side elevation of an ordinary table or household knife of the table or kitchen type, showing my improved guard in position thereon.

Fig. 2 is a view similar to Fig. 1, looking at the knife guard from the opposite side.

Fig. 3 is an end view, looking at the device from the handle end of the knife.

Fig. 4 is a perspective view of my improved safety knife guard detached from the blade.

Fig. 5 is a transverse vertical section on line 5—5 of Fig. 1, looking in the direction of the arrows.

Referring to the drawings, it will be observed my improved guard preferably comprises a length of metal, such as a round wire, or the like, that is continuous from end to end and bent to the shape hereinafter described. The guard preferably comprises a straight portion 10 that is disposed longitudinally and parallel to the cutting edge of the blade it is desired to protect, and the lower portion whereof is disposed in a plane that is slightly below said cutting edge so that it affords protection to the hands of the user. The end portions of the metal are bent upward, as at 11 and 12, at substantially right-angles to the straight edge, 10, to form suitable loops 13 and 14. The end nearest the handle is bent downwardly, as at 15, to a point below the cutting edge where it is bent back sharply in a hair-pin turn 16, around the cutting edge, and then upwardly to provide a spring finger 17, the upper end 18 whereof is bent laterally in a horizontal direction approximately parallel to the straight portion 10, to provide a suitable finger rest for use when the guard is being removed from the knife blade. The members 11, 15 and 17 are not truly parallel, but are bowed slightly inward toward each other, as shown in Fig. 3 of the drawings, so that the adjacent portion of the knife blade will be removably and adjustably clamped between these spring members, the cutting edge of the blade resting in the bottom of the hair-pin turn 16, as illustrated in Fig. 3.

The opposite end of the guard, after being formed into the loop 14, is bent downward, as at 19, to a point below the cutting edge of the blade, and then bent in a hair-pin turn 20, and thence alongside the blade to provide a spring member 21, that is extended a slight distance above the back edge of the knife where it is provided with a long sweep 22, extending rearward toward the knife handle and downward to a point below the edge of the back, where it is formed into a short hook-shaped member 23. The end of the wire, after forming this hooked member 23, is bent over the back of the knife blade in an arch 24, and then down along the opposite face of the blade, so that the end portion 25 thereof will be disposed substantially parallel with the bend 23 and shaped to correspond therewith.

The guard thus described is capable of being readily attached to knife blades of divers widths. All that is necessary to do is to insert the heel of the blade between the opposing spring members 15 and 17 and the outer end portion of the blade between the spring members 12 and 21 and force the same downward until the cutting edge has been brought into engagement with the bottom of the loops or hair-pin turns 16 and 20. The spring members will now frictionally engage the sides of the blade and the sweep 22 may then be raised slightly until the arch 24 snaps into position upon the back of the blade, as shown in Figs. 1, 2 and 3 of the drawings. It will be observed that the guard is now securely locked in position upon the knife blade and accidental removal is well-nigh impossible. The straight edge portion 10 is spaced a slight distance away from the cutting edge of the blade so that fruit, vegetables and the like, may be cut in thin, even slices for divers purposes, and by tilting the blade slightly, the paring operations may be regulated to a nicety.

While I have illustrated and described certain specific means for carrying out my invention, it, of course, will be obvious that divers modifications thereof may be made without materially departing from the spirit of my invention. For example, the sweep or spring 22 may be dispensed with or some other element employed as a substitute. Although primarily designed for slicing and paring vegetables, fruits, and the like, my invention is a well applicable to wood scrapers and similar wood-working tools, and may be used by a lefthanded person by simply reversing the position of the straight edge so that it will be disposed upon the opposite surface of the blade. I desire it understood, therefore, that all such refinements are included within the scope of my invention as expressed in the appended claims, to which reference is now made.

What I claim is:—

1. A safety knife guard comprising a straight-edged strip of metal disposed substantially parallel and in juxtaposition to the blade of a knife, compressible members at each end of said strip adapted to engage the sides of the blade, and a spring member extending over and engaging the back of the blade and normally pressing toward the same.

2. A safety knife guard comprising a strip of metal disposed adjacent and substantially parallel to the blade of a knife, means for removably securing said metal strip to the knife blade consisting of laterally disposed members at opposite ends of said strip which members are bent back upon themselves to provide blade-receiving pockets the sides whereof are bowed inward toward each other to frictionally engage the knife blade, and a spring member extending over and engaging the back of the knife blade intermediate the location of said lateral members.

3. A safety knife guard comprising a strip of metal disposed adjacent and substantially parallel to the blade of a knife, means for removably securing said metal strip to the knife blade consisting of laterally disposed members at opposite ends of said strip which members are bent back upon themselves to provide blade-receiving pockets the sides whereof are bowed inward toward each other to frictionally engage the knife blade, and a spring member extended over the knife from one end of said lateral members and adapted to engage the back of the knife blade intermediate the location of said lateral members.

4. A safety knife guard comprising a strip of metal disposed adjacent and substantially parallel to the blade of a knife, means for removably securing said metal strip to the knife blade consisting of laterally disposed members at opposite ends of said strip which members are bent back upon themselves to provide blade-receiving pockets the sides whereof are bowed inward toward each other to frictionally engage the knife blade, and a spring member extending over and engaging the back of the knife blade intermediate the location of said lateral members, said spring member provided with a recessed portion in which the back of the blade is adapted to be seated.

Signed at Los Angeles, county of Los Angeles, and State of California, this 2nd day of February, 1918.

JOHN M. FORSYTH.

Witnesses:
LYLE W. RUCKER,
A. W. WADSWORTH.

Copies of this patent may be obtained for five cents each, by addressing the "Commissioner of Patents, Washington, D. C."